(12) United States Patent
Koshiba

(10) Patent No.: US 8,316,133 B2
(45) Date of Patent: Nov. 20, 2012

(54) THIN CLIENT SYSTEM USING SESSION MANAGING SERVER AND SESSION MANAGING METHOD

(75) Inventor: Kunihiro Koshiba, Tokyo (JP)

(73) Assignee: NEC Corporation, Tokyo (JP)

( * ) Notice: Subject to any disclaimer, the term of this patent is extended or adjusted under 35 U.S.C. 154(b) by 818 days.

(21) Appl. No.: 11/763,745

(22) Filed: Jun. 15, 2007

(65) Prior Publication Data

US 2007/0294414 A1 Dec. 20, 2007

(30) Foreign Application Priority Data

Jun. 15, 2006 (JP) ................................. 2006-166559

(51) Int. Cl.
*G06F 15/16* (2006.01)
*G06F 9/455* (2006.01)

(52) U.S. Cl. .......................................... 709/227; 718/1

(58) Field of Classification Search .......... 709/201–203, 709/227–229; 718/1
See application file for complete search history.

(56) References Cited

U.S. PATENT DOCUMENTS

| | | | |
|---|---|---|---|
| 5,341,477 A | | 8/1994 | Pitkin et al. |
| 5,805,804 A | | 9/1998 | Laursen et al. |
| 6,317,775 B1 | | 11/2001 | Coile et al. |
| 6,324,177 B1 | * | 11/2001 | Howes et al. ................. 370/389 |
| 6,961,772 B1 | | 11/2005 | Wensel |
| 7,478,387 B2 | * | 1/2009 | Abelite et al. .................... 718/1 |
| 7,577,959 B2 | * | 8/2009 | Nguyen et al. ................. 718/105 |
| 2002/0164983 A1 | | 11/2002 | Raviv et al. |
| 2002/0196782 A1 | | 12/2002 | Furukawa et al. |
| 2003/0204562 A1 | | 10/2003 | Hwang |
| 2004/0060048 A1 | | 3/2004 | Abelite et al. |
| 2004/0121299 A1 | * | 6/2004 | Rougeau et al. ............... 434/365 |
| 2005/0108709 A1 | * | 5/2005 | Sciandra et al. ................... 718/1 |
| 2005/0198239 A1 | * | 9/2005 | Hughes ......................... 709/222 |
| 2005/0220039 A1 | | 10/2005 | Hoshino et al. |
| 2005/0228853 A1 | | 10/2005 | Yamamura et al. |
| 2005/0268328 A1 | | 12/2005 | Corliano |
| 2006/0031942 A1 | | 2/2006 | Jones et al. |
| 2006/0174087 A1 | * | 8/2006 | Hashimoto et al. ........... 711/173 |
| 2007/0073729 A1 | | 3/2007 | Tsunehiro et al. |
| 2007/0180448 A1 | * | 8/2007 | Low et al. ......................... 718/1 |
| 2007/0281689 A1 | | 12/2007 | Altman et al. |
| 2008/0070495 A1 | | 3/2008 | Stricklen et al. |
| 2008/0263217 A1 | * | 10/2008 | Kimizuka et al. ............. 709/229 |

FOREIGN PATENT DOCUMENTS

| | | |
|---|---|---|
| EP | 1 043 648 A2 | 10/2000 |
| JP | 8-263283 | 10/1996 |
| JP | 10-240812 | 9/1998 |
| JP | 2000-181821 | 6/2000 |

(Continued)

OTHER PUBLICATIONS

U.S. Official Action dated Jan. 5, 2010 from related U.S. Appl. No. 11/950,836.

(Continued)

*Primary Examiner* — Shirley Zhang
(74) *Attorney, Agent, or Firm* — Scully, Scott, Murphy & Presser, P.C.

(57) ABSTRACT

A thin client system includes a thin client server, a thin client terminal, and a session management server. The thin client server contains a plurality of execution sections respectively provided for tasks. The session management server is configured to assign the thin client terminal to a specific one of the plurality of execution sections.

15 Claims, 5 Drawing Sheets

FOREIGN PATENT DOCUMENTS

| | | |
|---|---|---|
| JP | 2001-282737 | 10/2001 |
| JP | 2002-111713 | 4/2002 |
| JP | 2002-323986 A | 11/2002 |
| JP | 2003-85059 | 3/2003 |
| JP | 2003-296208 | 10/2003 |
| JP | 2005-100344 | 4/2005 |
| JP | 2005-339133 | 12/2005 |
| JP | 2006-23990 | 1/2006 |
| JP | 2006-134176 | 5/2006 |
| JP | 2006-166559 | 6/2006 |
| JP | 2006-209609 | 8/2006 |
| JP | 2007-94610 | 4/2007 |
| TW | 514814 | 12/2002 |
| WO | WO 01/55813 A2 | 8/2001 |
| WO | WO 01/63401 A2 | 8/2001 |
| WO | WO 01/63402 A2 | 8/2001 |

OTHER PUBLICATIONS

N. Nakamura et al., "Service-Oriented Robust Processing Method on Autonomous System Management", Internet Research Laboratories, NEC Corporation, pp. 2-8E, vol. 104 (2004).

K. Morishige et al., "Operating System Trouble Handling Standard Management Tools are ineffective on Operating System Hang Ups Remote Monitoring Board Equipped With a Romote Restart", No. 23, pp. 108-111, Nikkei BP, Feb. 1, 1999.

U.S. Official Action dated Jun. 16, 2010 from related U.S. Appl. No. 11/950,836.

U.S. Official Action dated Apr. 13, 2011 from related U.S. Appl. No. 11/950,836, filed Dec. 5, 2007.

Japanese Official Action dated Mar. 2, 2011 together with a partial English language translation from JP 2006-166559.

Taiwanese Official Action dated Jul. 26, 2011 together with an English language translation from TW 096146049.

China Official Action dated Apr. 26, 2011 together with an English language translation from CN 200710111815.7.

Taiwanese Official Action dated Mar. 19, 2012 together with an English language translation from TW 096121707.

United States Office Action dated Dec. 1, 2011 received in related U.S. Appl. No. 11/950,836.

Koji, Yamada, "Point of Thin Client System Design That Uses Citrix Presentation Server", N+I Network, Softbank Publishing Corp., Sep. 1, 2005, vol. 5, No. 9, pp. 26-30.

Japanese Official Action dated Apr. 27, 2012 from related application JP 2009-167936 together with an English language translation.

Chinese Official Action dated Jun. 1, 2012 from related application CN200710196477.1 together with an English language translation.

\* cited by examiner

THIN CLIENT SYSTEM USING SESSION MANAGING SERVER AND SESSION MANAGING METHOD

TECHNICAL FIELD

The present invention relates to a thin client system, and more particularly relates to a thin client system in which session establishment is controlled.

BACKGROUND ART

In a client server system, a plurality of PCs are provided at different locations, and a plurality of tasks are concurrently executed by the plurality of PCs. Now, the client server system is shifted into a thin client system, in which an operating system (OS) and data used by a user exist on a thin client server. In the thin client system, the user needs to be aware of a connection destination server for a thin client terminal (hereafter, to be referred to as TC terminal) to be connected. Also, when a trouble has occurred in the operating system, a restart of the operating system needs to be requested for a system manger. In this way, in the thin client system, the operativity for the user becomes low, as compared with the conventional client server system.

For example, in the client server system in which a client terminal with a hard disk drive built therein is used, a user often uses a plurality of PCs to concurrently perform a plurality of tasks. The thin client system is being employed to reduce a terminal management cost or to cope with information leakage in recent years. The thin client system is provided with a thin client (TC) terminal in which no hard disk drive is built therein or a write operation to a hard disk driver is inhibited, and a thin client server in which an operating system, a task application program and data exist. The TC terminal and the server are connected with Remote Desktop Protocol, a network boot and the like. In case of the shift from the client server system to the thin client system, the user needs to be aware of the thin client server of a connection destination, or a manager needs to restart the operating system. Thus, there is a problem that the operativity of the terminal is low.

In conjunction with the above description, a network computer system is disclosed in Japanese Laid Open Patent Publication (JP-P2000-181821A: a first related art). This first related art relates to the network computer system provided with a first computer and a second computer that operates by obtaining an application program and an operating system through a network from this first computer. The second computer contains an identification data reader for reading an identification data from a person authentication storage medium which stores the identification data to identify a user; and an identification data transmitter for transmitting the identification data read by the identification data reader to the first computer. The first computer contains an identification data receiver for receiving the identification data transmitted by the second computer and a transmission program judging unit for judging an application program to be automatically transmitted to the second computer based on the identification data received by the identification data receiver.

Also, Japanese Laid Open Patent Publication (JP-P2002-111713A: a second related art) discloses a network system. This network system contains a name server; a plurality of servers whose names are solved by this name server; and a client which requests a name solution of a desirable server to the name server. The name server contains a database to manage a name, an IP address and an operational state of each server whose name is solved as mentioned above; a function that searches the database in response to the name solution request from the client to reply an IP address and also checks the operational state of the server whose name is solved, and if it is in a stop state, sends a start request packet to the server whose name is solved; and a function for carrying out a start process correspondingly to the start request packet received by each of the plurality of servers whose names are solved.

Also, Japanese Laid Open Patent Publication (JP-P2005-339133A: a third related art) discloses a shared personal computer system. This shared personal computer system has a shared user terminal with no disk; a PC initial environment managing server that stores and manages an initial environment configuration file so that the user terminal operates in a predetermined initial environment; and a personal data backup server that backs up an environment of the user terminal different for each user. The user terminal downloads the initial environment configuration file from the PC initial environment management server onto a memory and executes it to establish the initial environment and downloads an environment setting peculiar to a user from the personal data backup server onto the memory to set it.

Also, Japanese Laid Open Patent Publication (JP-A-Heisei, 8-263283: a fourth related art) discloses a software management system. In this software management system, a server and a plurality of terminal apparatuses are connected through a communication unit so that programs are shared by the respective terminal apparatuses. In this software management system, the server contains a management information storage unit for storing management information such as an identification name of the program and an identification name of a terminal apparatus by which the program is executed, an identification name of a user, and a password of the user. The server further contains a unit for judging a validity of whether or not the program can be executed on the terminal apparatus, based on the management information stored in the storage unit and a security check information received from the terminal apparatus; and a unit for transmitting the result judged by the judging unit to the terminal apparatus sending the security check information. The terminal apparatus further contains a unit that transmits to the server, the security check information such as the identification name of the program, the identification name of the terminal apparatus, the identification name of the user, the password of the user, each time the execution of the program is requested, and a unit for giving an execution right of the program in accordance with the judgment result received from the server.

SUMMARY

Therefore, the present invention provides a thin client system in which a session between a thin client terminal and a thin client server is managed or controlled.

In an exemplary aspect of the present invention, a thin client system includes a thin client server including a plurality of execution sections respectively provided for tasks, a thin client terminal; and a session management server configured to assign the thin client terminal to a specific one of the plurality of execution sections.

In another exemplary aspect of the present invention, a session management server in a thin client system, includes a connection destination setting table configured to store an execution section data indicating each of a plurality of execution sections provided for tasks for a user data indicating a user of a thin client terminal and a terminal data indicating the thin client terminal; and a session management section configured to search the connection destination setting table for the execution section data to the specific execution section based on the user data and the terminal data sent from the thin client terminal, and to connect the thin client terminal with the specific execution section of the thin client server based on the searched execution section data.

In still another exemplary aspect of the present invention, a thin client terminal includes a protocol management section configured to receives an execution section data for a task, and to establish a connection with a thin client server through a session management server, by using a protocol and the received execution section data; and a connection destination control section configured to acquire the execution section data in response to transmission of a user data and a terminal data, and to notify the execution section data to the protocol management server.

In another exemplary aspect of the present invention, a session management method in a thin client system, is achieved by assigning a thin client terminal to a specific one of a plurality of execution sections respectively provided for tasks in a thin client server; by connecting the thin client terminal and the thin client server through a session management server; and by managing a status of the connection between the thin client terminal and the thin client server in the session management server.

In another exemplary aspect of the present invention, a computer-readable software product for achieving a method which includes preparing a connection destination setting table, wherein the connection destination setting table stores an execution section data indicating each of a plurality of execution sections provided for tasks in a thin client server, for a user data indicating a user of a thin client terminal and a terminal data indicating the thin client terminal; searching the connection destination setting table for a specific one of the plurality of execution sections based on the user data and the terminal data; and reconnecting when the thin client terminal and a thin client server when the status of the connection between the thin client terminal and the thin client server indicates that the connection is disconnected but is in a use state.

BRIEF DESCRIPTION OF THE DRAWINGS

The above and other objects, advantages and features of the present invention will be more apparent from the following description of certain preferred embodiments taken in conjunction with the accompanying drawings, in which.

EXEMPLARY EMBODIMENTS

Hereinafter, a thin client system according to exemplary embodiments of the present invention will be described in detail with reference to the attached drawings. However, the present invention is not limited to these exemplary embodiments.

Figure 1:
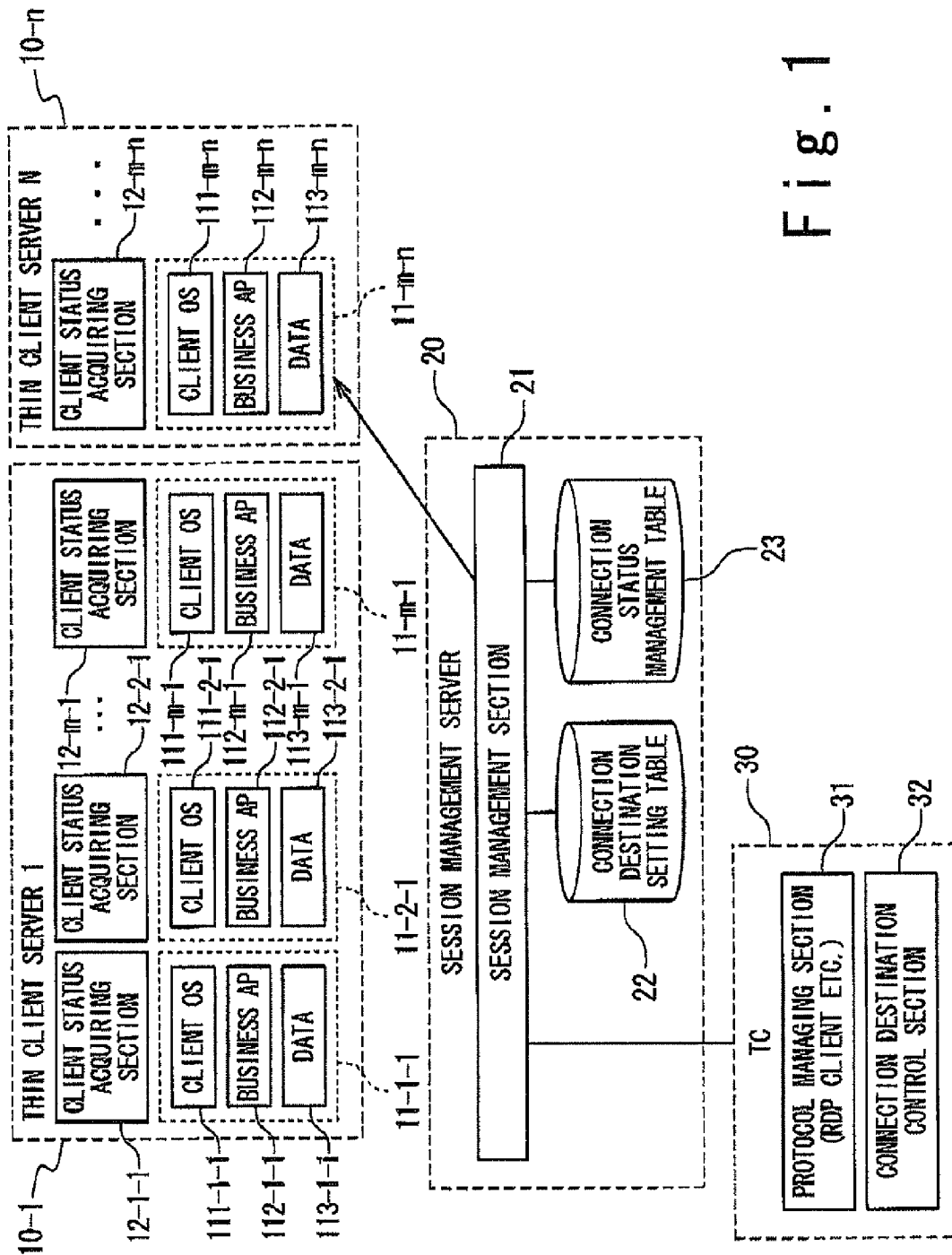
FIG. 1 is a block diagram showing a configuration of the present invention.

With reference to FIG. 1, the thin client system according to a first exemplary embodiment of the present invention includes thin client servers 10 ($10\text{-}i$, i=1 to n: n is the number of servers), a ession management server 20 and thin client (TC) terminals 30.

The thin client server 10 contains executing sections (task image) 11 ($11\text{-}k\text{-}i$, k=1 to m, i=1 to n) and client status acquiring sections 12 ($12\text{-}k\text{-}i$, k=1 to m, i=1 to n). The executing section 11 includes a client operating system (OS) 111, an application program (AP) 112 for a task and a data 113 for the task. The application program 112 is executed on the operating system 111 by using the data 113. The client status acquiring section 12 acquires the status of the operating system 111 of the corresponding executing section 11. The executing section 11 is assigned for each connection from the TC terminal 30. Thus, when the number of the connections from the TC terminals 30 is m, there are m sets of the executing section 11 and the client status acquiring section 12 for each thin client server 10.

The session management server 20 is a server for carrying out session management. The session management server 20 contains a session management section 21, a connection destination setting table 22 and a connection status management table 23.

Figure 2:
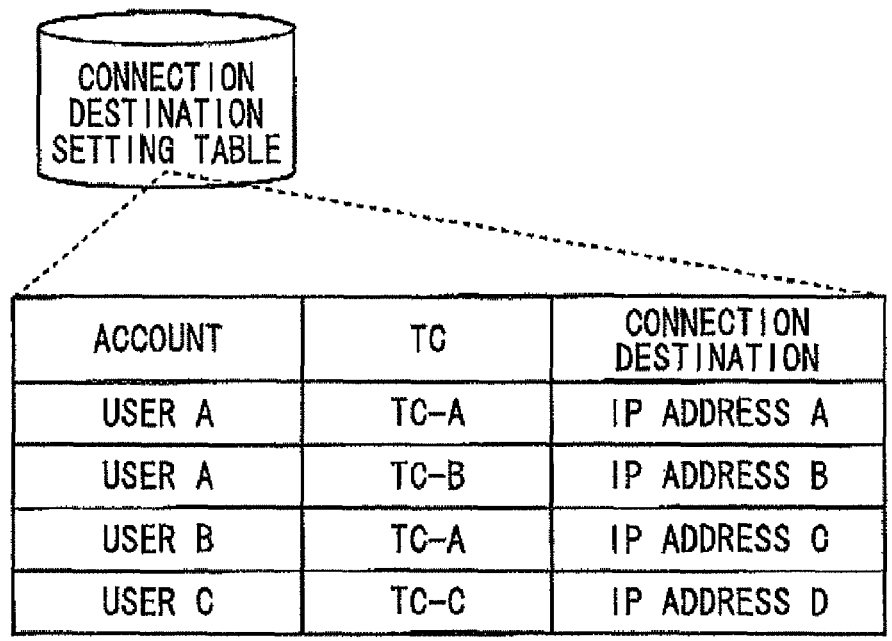
FIG. 2 is a view showing a content of a connection destination setting table.

FIG. 2 shows the detail of the connection destination setting table 22. With reference to FIG. 2, the connection destination setting table 22 contains definition data indicating an executing section 11 to be connected, on the basis of a combination of a data indicating a user (accounts) and a data indicating a TC terminal as a key. For example, with reference to FIG. 2, when the user is A and the use terminal is a TC-A, the connection destination is an IP address A. The connection destination setting table 22 stores the data indicating the executing section 11 as a connection destination such as an IP address. The connection destination IP address corresponds to one executing section 11. Therefore, the data indicating the connection destination may be the task or a name of the task application program. The connection destination setting table 22 is prepared in advance, and permits one executing section 11 to be assigned to the TC terminal 30.

Figure 3:
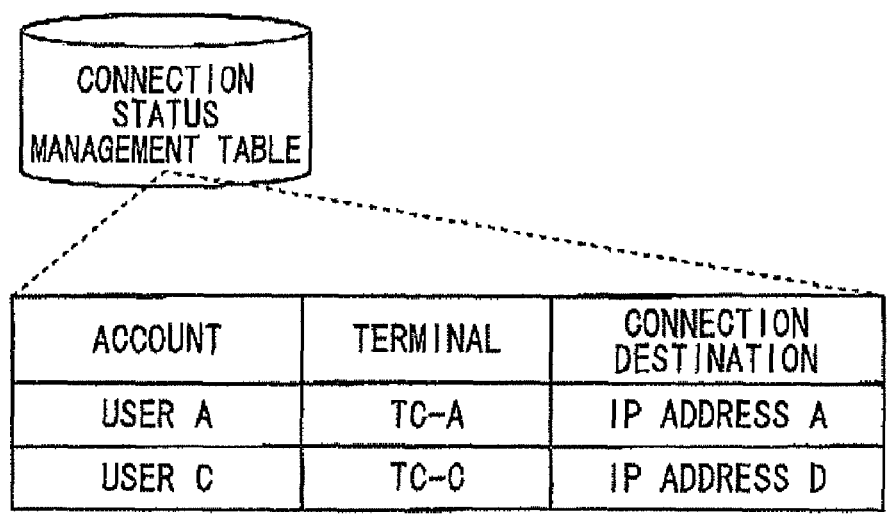
FIG. 3 is a view showing a content of a connection status management table.

FIG. 3 shows the detail of the connection status management table 23. With reference to FIG. 3, the connection status management table 23 contains a status data list indicating the executing section in a use state based on a data indicating a user (account) and a data indicating a TC terminal. For example, with reference to FIG. 3, a status is shown that the user A is connected to the IP address A from the terminal TC-A.

The session management section 21 refers to the connection destination setting table 22 in response to a connection request from the TC terminal 30, determines a connection destination, and replies the connection destination to the TC terminal 30. The connection request includes the data indicating the user and the data indicating the TC terminal. That is, the session management section 21 searches the connection destination setting table 22 for the connection destination based on the connection request. When the TC terminal 30 is connected with the executing section 11 based on the connection destination IP address, the session management section 21 receives the connection status from the client status acquiring section 12 and writes the client status in the connection status management table 23. When the session management section 21 receives a connection request after the session is disconnected between the TC terminal 30 and the executing section 11, the session management section 21 refers to the connection status management table 23. At this time, if the connection status management table 23 indicates that the session is in a use state, the session management section 21 reconnects the session in response to the connection request.

Also, when the session management section 21 receives a data indicating that a failure has occurred in the operating system 111 of the executing section 11, the user data and the terminal data, the session management section 21 searches the connection status management table 23. If the operating system 111 is currently used, the session management section 21 inquires the status of the operating system to the client status acquiring section 12. In case of an abnormal response or in case of no response, the session management section 21 determines that the operating system is in a failure and restarts the executing section 11 currently being used.

The TC terminal 30 is a terminal for communicating with the thin client server 10 through the session management server 20. However, the TC terminal 30 may be directly connected with the thin client server 10. The TC terminal 30 contains a protocol managing section 31 and a connection destination control section 32. The protocol managing section 31 establishes a connection to the thin client server 10 through the session management server 20, by using a protocol such as a Remote Desktop Protocol (hereafter, to be referred to as RDP). The connection destination control section 32 specifies the user and the TC terminal. The protocol managing section 31 issues a connection request containing the specified user data and terminal data to the session management section 21, and receives the connection destination such as the IP address.

Figure 4:
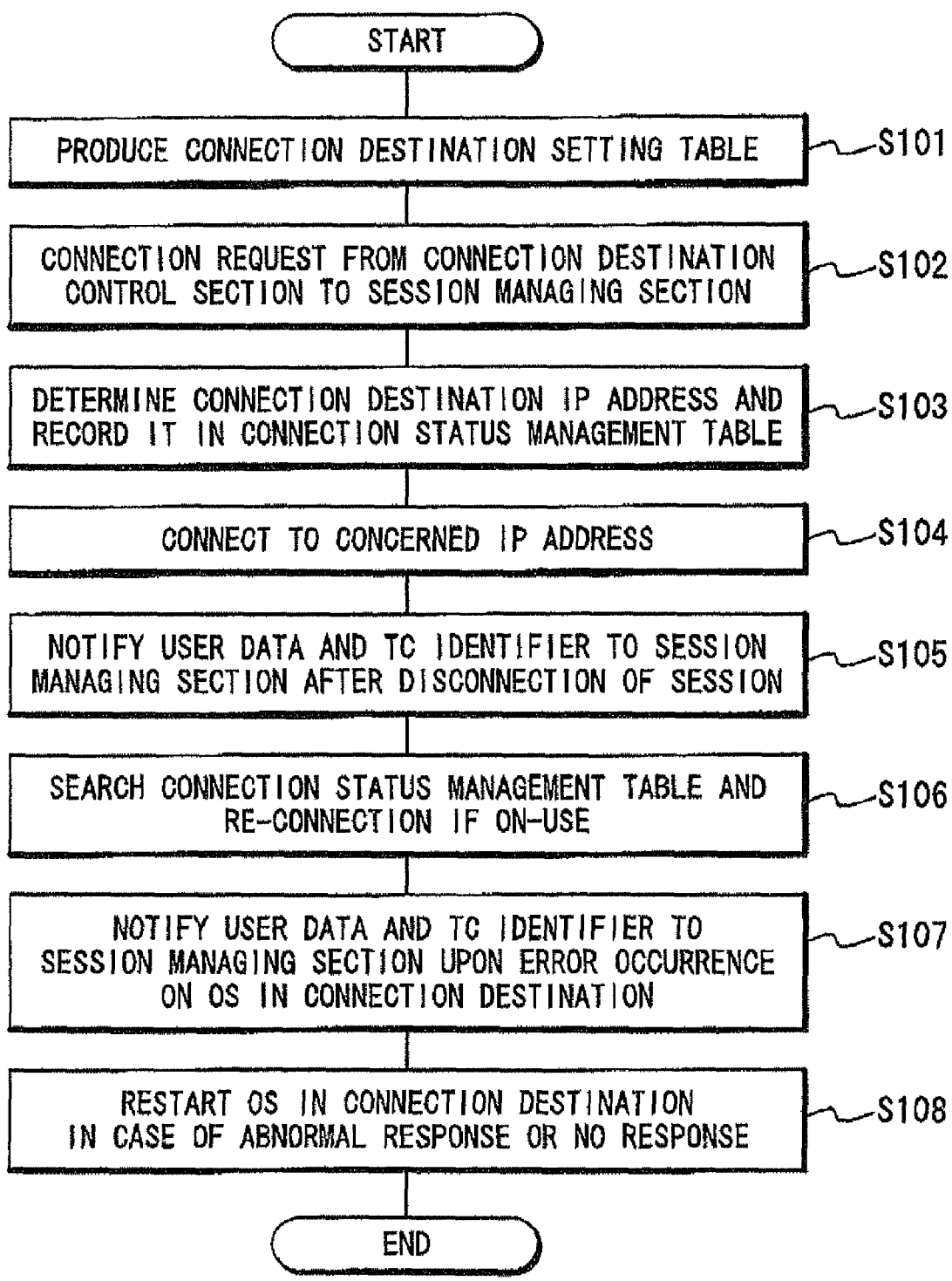
FIG. 4 is a flowchart showing operations of the present invention.

The operation of the session management system according to the first exemplary embodiment will be described below in detail with reference to FIG. 4.

(1) Step S101

Prior to a system operation, the connection destination setting table 22 is produced and prepared.

(2) Step S102

Next, when the use of the TC terminal 30 is started, the connection destination control section 32 reads a data from its internal storage to display a login screen and consequently obtains a user (user account) data and a data (a MAC address and the like) to identify the TC terminal 30 and then issues a connection request on the session management section 21.

(3) Step S103

The session management section 21 searches the connection destination setting table 22 (FIG. 2) based on the user and the terminal data, which are sent from the connection destination control section 32 in response to the connection request, and determines a connection destination IP address and then replies to the connection destination control section 32 in response to the connection request and also records the result on the connection status management table 23.

(4) Step S104

The connection destination control section 32 reports the connection destination IP address to the protocol managing section 31 and consequently performs the connection to the executing section 11 having the determined IP address.

(5) Step S105

Also, after the session disconnection is carried out by the user or the session disconnection caused by the trouble on a communication route, when the user executes the connection destination control section 32, the user (user account) information and the information (the MAC address and the like) to identify the TC terminal 30 are similarly sent to the session management section 21.

(6) Step S106

The session management section 21 retrieves the connection status management table 23 (FIG. 3), and if it is currently used, replies the IP address currently being used to the connection destination control section 32, and then performs the reconnection on the executing section 11 currently being used.

(7) Step S107

Also, when a failure has occurred in the operating system (the client operating system 111 and the like) of the executing section 11 currently being connected, the user executes the connection destination control section 32 and similarly sends the user (user account) information and the information (the MAC address and the like) to identify the TC terminal 30 to the session management section 21.

(8) Step S108

The session management section 21 searches the connection status management table (FIG. 3), and if it is currently used, inquires the operating system status to the client status acquiring section 12. In case of an abnormal response or in case of no response, this judges it as an operating system trouble. Thus, the session management section 21 restarts the operating system or the executing section 11 currently being used.

It should be noted that the operation in this exemplary embodiment as mentioned above may be carried out by using various programs to be executed by a computer. The programs describe command sentences and definitions that are required for the computer to attain the operations in this exemplary embodiment.

Next, the session management system according to a second exemplary embodiment of the present invention will be described below. The session management system according to the second exemplary embodiment relates to the assignment of a plurality of executing sections. The assignment of the plurality of executing sections will be described below in detail with reference to FIG. 5.

Figure 5:
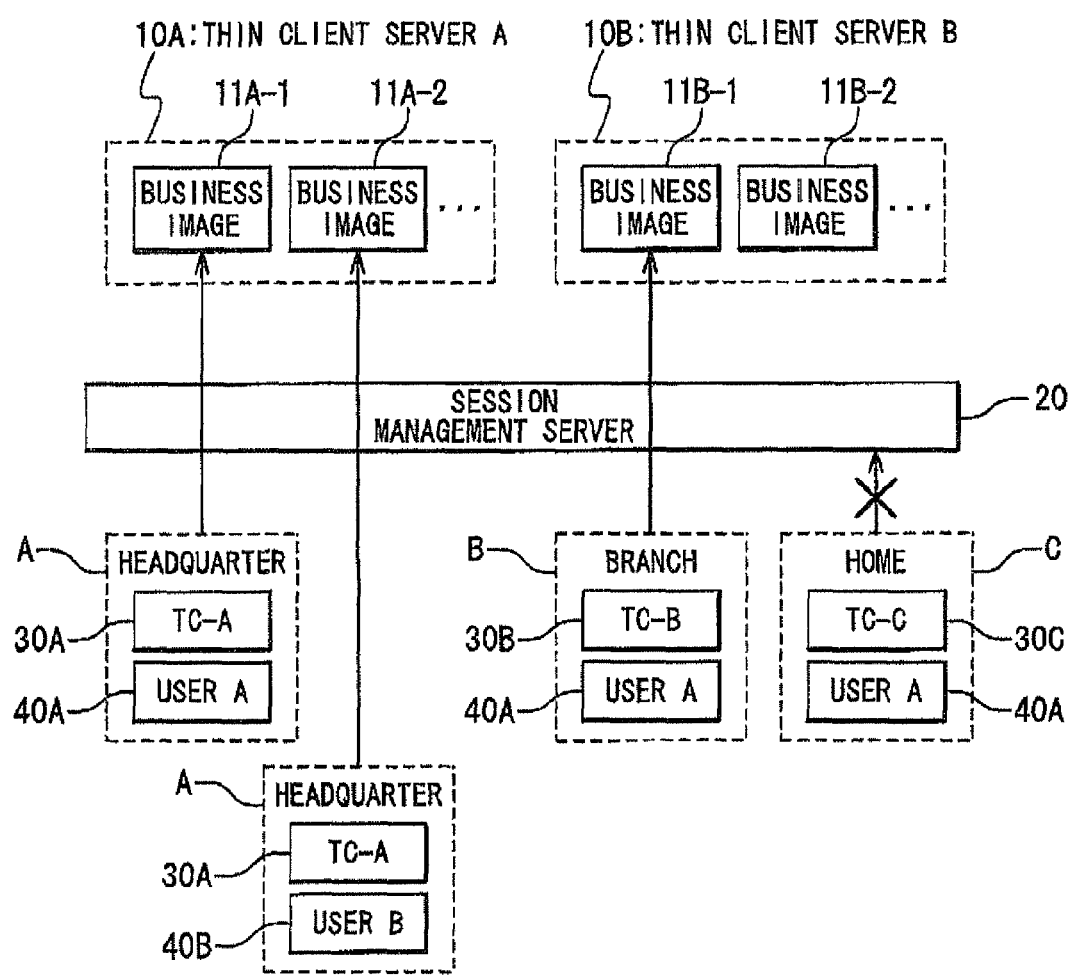
FIG. 5 is a view showing an assignment of a plurality of executing sections.

In FIG. 5, for example, a user A 40A serves a task a and a task b, and the task a is executed from a terminal TC-A 30A in a head office A, and the task b is executed from the terminal TC-B 30B in a branch B, and the data and applications which are used for the respective tasks are different. Therefore, the connection destination setting table is defined as shown in FIG. 2.

When the user A 40A carries out the task a from the terminal TC-A 30A, the terminal TC-A is connected to a task image (IP address A) 11A-1 that has the application and data for the task a, in accordance with the connection destination setting table (FIG. 2) of the session management server 20. Similarly, when the user A carries out the task b from the terminal TC-B 30B, the terminal TC-B 30B is connected to a task image (IP address B) 11B-1 for the task b. It should be noted that the task image corresponds to the executing section (execution image) 11.

Also, even when the task is carried out from the terminal TC-A 30A, the terminal TC-A 30A is connected to the IP address C from the third setting of the connection destination setting table (FIG. 2), if a user B 40B logs on.

Next, the session management system according to a third exemplary embodiment of the present invention will be described below. The session management system according to the third exemplary embodiment relates to terminal authentication. The terminal authentication will be described below in detail with reference to FIGS. 5 and 6.

In FIG. 5, when the user A 40A tries to execute the task a from the terminal TC-C 30C, this is not registered on the connection destination setting table (FIG. 2) of the session management server 20. Thus, even in case of the user A 40A, the task cannot be executed.

Figure 6:
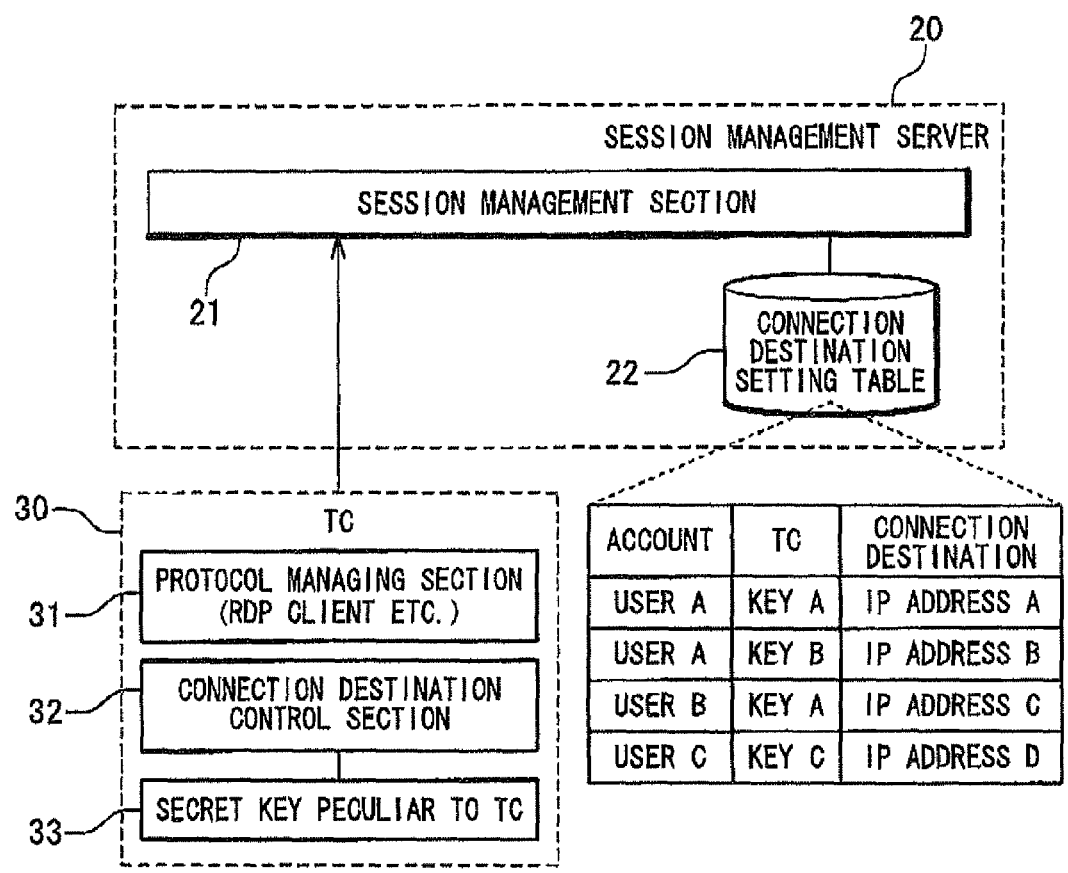
FIG. 6 is a view showing a terminal authentication.

Moreover, in FIG. 6, a secret key 33 peculiar to the TC terminal 30 is distributed to the TC terminal 30 or written in ROM onto the TC terminal 30 and receives the distribution of the secret key 33 from the TC terminal 30. The session management section to which the secret key 33 or a public key corresponding to the secret key 33 is distributed, registers the public key corresponding to the secret key 33, as the TC terminal data of the connection destination setting table 22. Thus, if the execution of the task is tried from the terminal TC-C 30C in FIG. 5, illegal connection through camouflage of the IP address and the MAC address of the terminal TC-C 30C can be protected.

It should be noted that the present invention can be applied to a system, in which the operativity for the user is inherited and a high security is required, in case of the shift to the thin client system from a client server system.

As mentioned above, the session management system of the present invention may include the session management server 20 for managing the session between the thin client server 10 and the TC terminal 30, and the connection destination control section 32 for notifying the connection destination IP address to the protocol managing section 31. The connection destination control section 32 sends the user data and the terminal data to the session management section 21. The session management section 21 refers to the connection destination setting table 22 and the connection status management table 23 and consequently connects the TC terminal to the executing section 11 in which the task application and data are provided in accordance with the user and the terminal (use location).

Also, at the time of the session disconnection, when the user of the TC terminal 30 re-starts the connection destination control section 32, the user data and the terminal data are sent to the session management section 21. The session management section 21 refers to the connection status management table 23 and specifies the executing section 11 currently being used. The status of the corresponding executing section 11 is obtained from the client status acquiring section. If the operating system is normal, the reconnection is carried out, and if the operating system is abnormal, the operating system is restarted.

In the present invention, since the connection destination is set in advance, the connection destination can be dynamically determined with no relation to any intention of the user. Also, since the connection destination is set in advance, the access from an illegal terminal can be protected. Moreover, since the connection status is held, reconnection after the session disconnection is possible. In addition, since the connection status is held and the operating system status is obtained, the operating system can be automatically restarted in response to a reconnection request from the user when the operating system trouble has occurred.

In this way, in the present invention, the thin client system manages the session between the thin client terminal and the thin client server, by using a set of the user and the terminal as a key. Thus, the user can restart the task through the automatic connection to the thin client server or the reconnection of the session for the purpose (task) with no relation to any intention of the user. Also, the operating system on the thin client server side can be started and shut down by the user. Thus, even the thin client system can carry out the operation similar to the conventional client server system.

As described above, the task corresponding to the user and the use location (terminal) can be carried out only through the input of the log-on ID and the password. Similarly to the client server system, the user is not required to be aware of the thin client server of the connection destination. This is because the session management server automatically determines the thin client server to be connected, on the basis of the user and the terminal.

The operating system can be restarted by the user. The recovery when a trouble has occurred in operating system can be quick without any request to the system manager. This is because the session management server automatically restarts the operating system from the connection status and the operating system state.

Use from an illegal terminal can be prevented. Also, the employment of the encryption can further increase the safety. This is because the connection source TC terminal is determined in accordance with the connection destination setting table.

Although the present inventions has been described above in connection with several exemplary embodiments thereof, it will be apparent to those skilled in the art that those exemplary embodiments are provided only for illustrating the present invention, and should not be relied upon to construe the appended claims in a limiting sense.

Also, the present invention provides a thin client system in which a user can execute a restart of a task through an automatic connection to a thin client server and a reconnection of a session based on a task with no relation to any intention of the user.

In addition, the present invention provides a thin client system, in which the operativity of the thin client terminal similar to a client server system can be ensured.

What is claimed is:

1. A thin client system comprising:
   a thin client server comprising a plurality of execution sections respectively provided for tasks,
   a thin client terminal having internal storage; and
   a session management server assigning said thin client terminal to a specific one of said plurality of execution sections, said session management server comprising:
      a connection destination setting table storing an execution section data comprising, for each of said plurality of execution sections, a user data indicating a user of said thin client terminal and a terminal data having identification data identifying said thin client terminal;
      a session management section selecting, at the start of use of the thin client terminal, from said connection destination setting table said execution section data corresponding to said specific execution section based on said user data and said terminal data sent from said thin client terminal, and connecting said thin client terminal with said specific execution section of said thin client server based on said selected execution section data as a connection destination;
   said thin client terminal comprising:
      a protocol management section receiving said execution section data, and establishing a connection with said thin client server through said session management server, by using a protocol and the received execution section data; and
      a connection destination control section acquiring said execution section data in response to transmission of said user data and said terminal data, and notifying said execution section data of said protocol management section,
   wherein said thin client terminal establishes the connection between said thin client terminal and said thin client server through said session management server, and
   said session management section acquires said execution section data in response to reception of said user data and said terminal data from said thin client terminal, when the connection is disconnected, acquires a status of said specific execution section, and carries out reconnection of said thin client terminal when the status of said specific execution section indicates that said specific execution section is normal.

2. The thin client system according to claim 1, wherein each of said plurality of execution sections comprises:
   an operating system;
   an application program provided for a corresponding task, and executed on said operating system; and
   a data used by said application program.

3. The thin client system according to claim 1, wherein said thin client server further comprises:
   a client status acquiring section provided for each of said plurality of execution sections to hold a status of said execution section.

4. The thin client system according to claim 1, wherein said thin client terminal has a secret key peculiar to said thin client terminal, and
   said connection destination setting table stores a public key corresponding to said secret key as said terminal data.

5. The thin client system according to claim 1, wherein said session management server further comprises:
   a connection state management table,
   said session management section stores said execution section data, said user data, and said terminal data in said connection state management table when said thin client is connected with said specific execution section.

6. The thin client system according to claim 1, wherein said session management section restarts said specific execution section when the status of said specific execution section indicates that said specific execution section is abnormal.

7. A session management server in a thin client system having a thin client terminal, comprising:
   a connection destination setting table storing, in internal storage of the session management server, an execution section data indicating each of a plurality of execution sections provided for tasks for a user data indicating a user of said thin client terminal and a terminal data having identification data identifying said thin client terminal; and
   a session management section searching said connection destination setting table for said execution section data corresponding to said specific execution section based on said user data and said terminal data sent from said thin client terminal, selecting, at the start of use of the thin client terminal, the corresponding specific execution section data, connecting said thin client terminal with said specific execution section of said thin client server based on said searched execution section data as a connection destination, and when the connection is disconnected, acquiring a status of said specific execution section and carrying out reconnection of said thin client terminal when the status of said specific execution section indicates that said specific execution section is normal.

8. The session management server according to claim 7, wherein said thin client terminal has a secret key peculiar to said thin client terminal, and said connection destination setting table stores a public key corresponding to said secret key as said terminal data.

9. The session management server according to claim 7, further comprising:
   a connection state management table,
   wherein said session management section stores said execution section data, said user data, and said terminal data in said connection state management table when said thin client is connected with a specific execution section.

10. A session management method in a thin client system, comprising:
    assigning a thin client terminal to a specific one of a plurality of execution sections respectively provided for tasks in a thin client server;
    connecting said thin client terminal and said thin client server through a session management server;
    managing a status of the connection between said thin client terminal and said thin client server in said session management server;
    preparing a connection destination setting table, wherein said connection destination setting table stores an execution section data indicating each of said plurality of execution sections for a user data indicating a user of said thin client terminal and a terminal data having identification data identifying said thin client terminal; and
    searching, at the start of use of the thin client terminal, said connection destination setting table for said specific execution section based on said user data and said terminal data, connecting the thin client terminal with said specific execution section of the thin client server based on said searched execution section data as a connection destination, and when the connection is disconnected, acquiring a status of said specific execution section and carrying out reconnection of the thin client terminal when the status of said specific execution section indicates that said specific execution section is normal.

11. The session management method according to claim 10, further comprising:
    reconnecting when said thin client terminal and said thin client server when said status of the connection between said thin client terminal and said thin client server indicates that the connection is disconnected but is in a use state.

12. The session management method according to claim 11, further comprising:
    receiving an execution section data for a task;
    acquiring said execution section data in response to transmission of a user data and a terminal data; and
    notifying said execution section data of said protocol management section.

13. A non-transitory computer readable storage medium having computer-readable software product for achieving a method which comprises:
    preparing a connection destination setting table, wherein said connection destination setting table stores an execution section data indicating each of a plurality of execution sections provided for tasks in a thin client server, for a user data indicating a user of a thin client terminal and a terminal data having identification data identifying said thin client terminal;
    searching, at the start of use of the thin client terminal, said connection destination setting table for a specific one of said plurality of execution sections based on said user data and said terminal data;
    connecting the thin client terminal with said specific execution section of the thin client server based on said searched execution section data as a connection destination, and when the connection is disconnected, acquiring a status of said specific execution section and carrying out reconnection of the thin client terminal when the status of said specific execution section indicates that said specific execution section is normal.

14. The computer-readable software product according to claim 13, wherein said method further comprises:
receiving and holding said execution section data, said user data and said terminal data.

15. The computer-readable software product according to claim 14, wherein said method further comprises:
restarting said specific execution section when a failure has occurred in said specific execution section.

* * * * *